US012645264B2

(12) United States Patent
Chang et al.

(10) Patent No.:  US 12,645,264 B2
(45) Date of Patent:       Jun. 2, 2026

(54) HORSESHOE HINGE FRAME ANTENNA FOR AN INFORMATION HANDLING SYSTEM

(71) Applicant: Dell Products, LP, Round Rock, TX (US)

(72) Inventors: Ching Wei Chang, Cedar Park, TX (US); Sumana Pallampati, Austin, TX (US); Changsoo Kim, Cedar Park, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 848 days.

(21) Appl. No.: 17/733,952

(22) Filed: Apr. 29, 2022

(65) Prior Publication Data

US 2023/0350467 A1      Nov. 2, 2023

(51) Int. Cl.
| | |
|---|---|
| *G06F 1/16* | (2006.01) |
| *H01Q 1/22* | (2006.01) |
| *H01Q 1/38* | (2006.01) |
| *H01Q 9/42* | (2006.01) |

(52) U.S. Cl.
CPC .......... *G06F 1/1681* (2013.01); *G06F 1/1656* (2013.01); *G06F 1/1683* (2013.01); *H01Q 1/2266* (2013.01); *H01Q 1/38* (2013.01); *H01Q 9/42* (2013.01)

(58) Field of Classification Search
CPC .... G06F 1/1681; G06F 1/1656; G06F 1/1683; G06F 1/1616; G06F 1/1698; H01Q 1/2266; H01Q 1/38; H01Q 9/42; H01Q 21/28
See application file for complete search history.

(56) References Cited

U.S. PATENT DOCUMENTS

| | | | | |
|---|---|---|---|---|
| 6,469,668 | B1 * | 10/2002 | Jones ....................... | H01Q 3/06 |
| | | | | 343/702 |
| 7,301,501 | B2 * | 11/2007 | De Vos .................. | H01Q 5/371 |
| | | | | 343/702 |
| 9,203,137 | B1 * | 12/2015 | Guterman .............. | H01Q 1/243 |
| 9,912,039 | B2 * | 3/2018 | Lepe ...................... | G06F 1/1681 |
| 10,831,245 | B1 * | 11/2020 | Miyamoto ............ | G06F 1/1681 |
| 11,392,181 | B2 * | 7/2022 | Yoo .......................... | H01Q 9/42 |
| 2003/0231134 | A1 * | 12/2003 | Yarasi .................. | H01Q 9/0442 |
| | | | | 343/702 |
| 2004/0204199 | A1 * | 10/2004 | Zax ..................... | H04M 1/0247 |
| | | | | 455/90.3 |

(Continued)

*Primary Examiner* — Jinsong Hu
*Assistant Examiner* — Rui M Hu
(74) *Attorney, Agent, or Firm* — Prol Intellectual Property Law, PLLC; H. Kenneth Prol

(57)      ABSTRACT

A horseshoe hinge frame antenna holder and antenna integrated into an edge of a base chassis of an information handling system comprising a body having a radiofrequency material to fit under a metallic top cover of a base chassis and having an outer-facing wall, where the outer-facing wall of the horseshoe hinge frame antenna holder frames out a portion of a horseshoe-shaped hinge cavity at an edge of the base chassis to receive an articulating hinge to couple the base chassis to a display chassis, an antenna pattern etched onto the horseshoe hinge frame antenna holder in a conductive material to form the antenna, where the antenna is operatively coupled to a wireless adapter of the information handling system to transmit or receive radiofrequency waves via the horseshoe-shaped hinge cavity.

20 Claims, 9 Drawing Sheets

(56)         References Cited

U.S. PATENT DOCUMENTS

| | | | | |
|---|---|---|---|---|
| 2008/0211723 A1* | 9/2008 | Tsubono | H01Q 7/00 | |
| | | | 343/702 | |
| 2009/0267266 A1* | 10/2009 | Lee | G06F 1/181 | |
| | | | 264/272.11 | |
| 2013/0070405 A1* | 3/2013 | Ashcraft | G06F 1/1662 | |
| | | | 361/679.08 | |
| 2014/0361932 A1* | 12/2014 | Irci | H01Q 1/2266 | |
| | | | 343/702 | |
| 2015/0155613 A1* | 6/2015 | Hotta | H01Q 13/16 | |
| | | | 343/702 | |
| 2015/0255851 A1* | 9/2015 | Guterman | H01Q 9/42 | |
| | | | 343/702 | |
| 2016/0197398 A1* | 7/2016 | Scheim | H01Q 1/286 | |
| | | | 343/713 | |
| 2017/0117611 A1* | 4/2017 | Lepe | H01Q 13/10 | |
| 2017/0212554 A1* | 7/2017 | Guterman | G06F 1/1681 | |
| 2017/0373374 A1* | 12/2017 | Moon | H01Q 1/24 | |
| 2018/0210499 A1* | 7/2018 | Tsubaki | G06F 1/1616 | |

| | | | | |
|---|---|---|---|---|
| 2019/0067794 A1* | 2/2019 | Klein | H01Q 1/48 | |
| 2019/0237848 A1* | 8/2019 | Ramasamy | G06F 1/1683 | |
| 2020/0014089 A1* | 1/2020 | Hung | H01Q 5/307 | |
| 2020/0183465 A1* | 6/2020 | Yoo | H01Q 1/2258 | |
| 2020/0186900 A1* | 6/2020 | Ishihara | H01Q 9/42 | |
| 2020/0192438 A1* | 6/2020 | Chang | G06F 1/1616 | |
| 2020/0381801 A1* | 12/2020 | Oh | H01Q 1/2266 | |
| 2021/0175606 A1* | 6/2021 | Ramasamy | H01Q 1/52 | |
| 2021/0175608 A1* | 6/2021 | Ramasamy | H01Q 1/2266 | |
| 2022/0052451 A1* | 2/2022 | Yong | H01Q 5/25 | |
| 2022/0069437 A1* | 3/2022 | Yoo | H01Q 1/42 | |
| 2023/0101668 A1* | 3/2023 | Oh | H01Q 1/44 | |
| | | | 343/702 | |
| 2023/0155275 A1* | 5/2023 | Lai | H01Q 13/18 | |
| | | | 343/700 R | |
| 2023/0223681 A1* | 7/2023 | Barrera | H01Q 1/2291 | |
| | | | 343/702 | |
| 2024/0030607 A1* | 1/2024 | Zhou | G06F 1/1698 | |
| 2024/0211006 A1* | 6/2024 | Thakur | H01Q 3/06 | |
| 2024/0275059 A1* | 8/2024 | Yong | H01Q 1/243 | |
| 2025/0105490 A1* | 3/2025 | Chiotellis | H01Q 1/38 | |

* cited by examiner

300

301    330    301

325    305

Ant 1
315    325

335    310

Ant 2
320    302

340

302

917

964

922

921

962

962

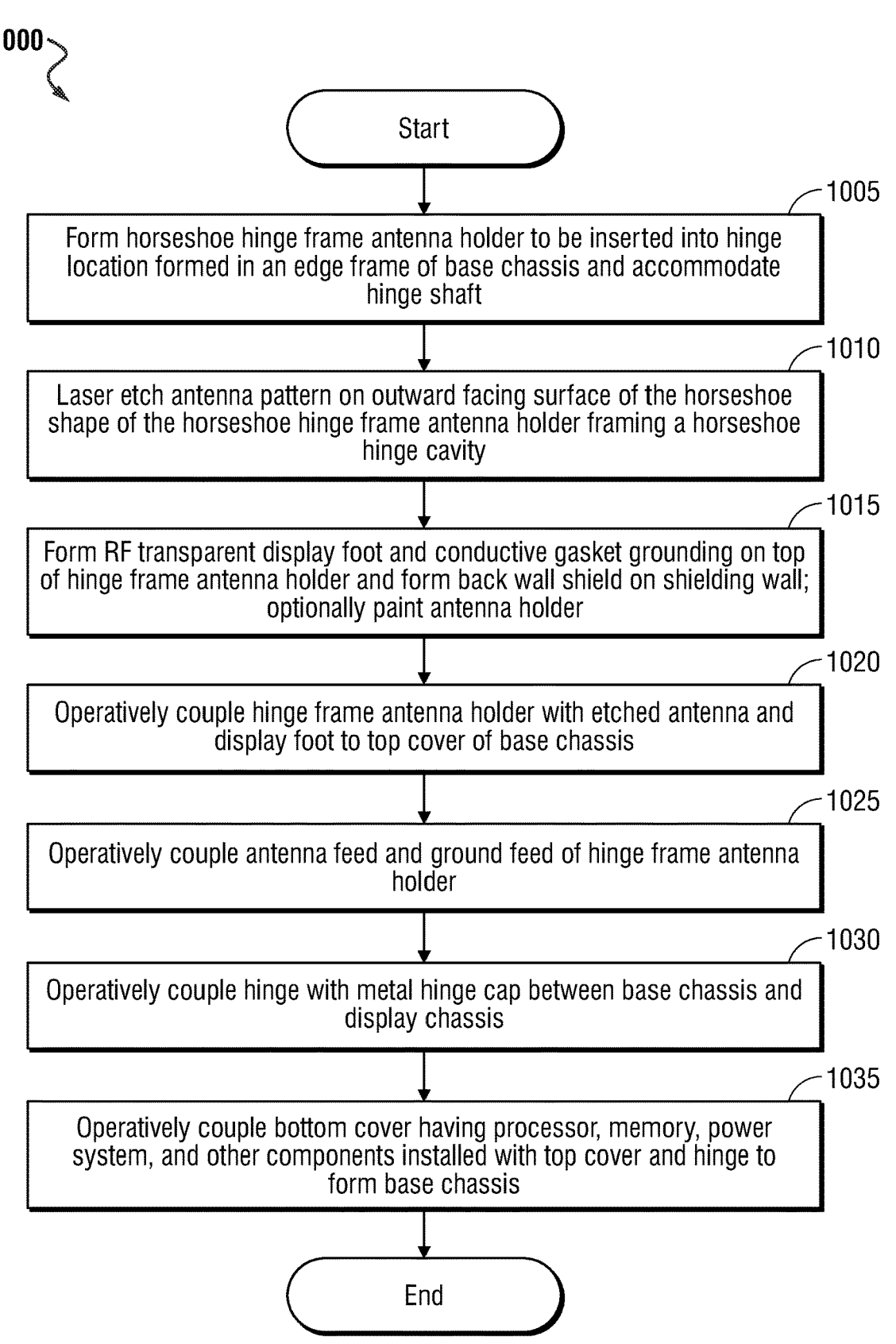

1000

Start

1005
Form horseshoe hinge frame antenna holder to be inserted into hinge location formed in an edge frame of base chassis and accommodate hinge shaft 1010
Laser etch antenna pattern on outward facing surface of the horseshoe shape of the horseshoe hinge frame antenna holder framing a horseshoe hinge cavity 1015
Form RF transparent display foot and conductive gasket grounding on top of hinge frame antenna holder and form back wall shield on shielding wall; optionally paint antenna holder 1020
Operatively couple hinge frame antenna holder with etched antenna and display foot to top cover of base chassis 1025
Operatively couple antenna feed and ground feed of hinge frame antenna holder 1030
Operatively couple hinge with metal hinge cap between base chassis and display chassis 1035
Operatively couple bottom cover having processor, memory, power system, and other components installed with top cover and hinge to form base chassis End

FIG. 10

HORSESHOE HINGE FRAME ANTENNA FOR AN INFORMATION HANDLING SYSTEM

FIELD OF THE DISCLOSURE

The present disclosure generally relates to wireless system in information handling systems. The present disclosure more specifically relates to an antenna system apparatus for use with one or more wireless protocols in an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may utilize one or more antenna systems to wirelessly transmit and receive data under one or more wireless protocols.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 10 is a flow diagram illustrating a method of assembling horseshoe hinge frame antenna holder and antenna in an information handling system according to an embodiment of the present disclosure.

The use of the same reference symbols in different drawings may indicate similar or identical items.

DETAILED DESCRIPTION OF THE DRAWINGS

Figure 1:
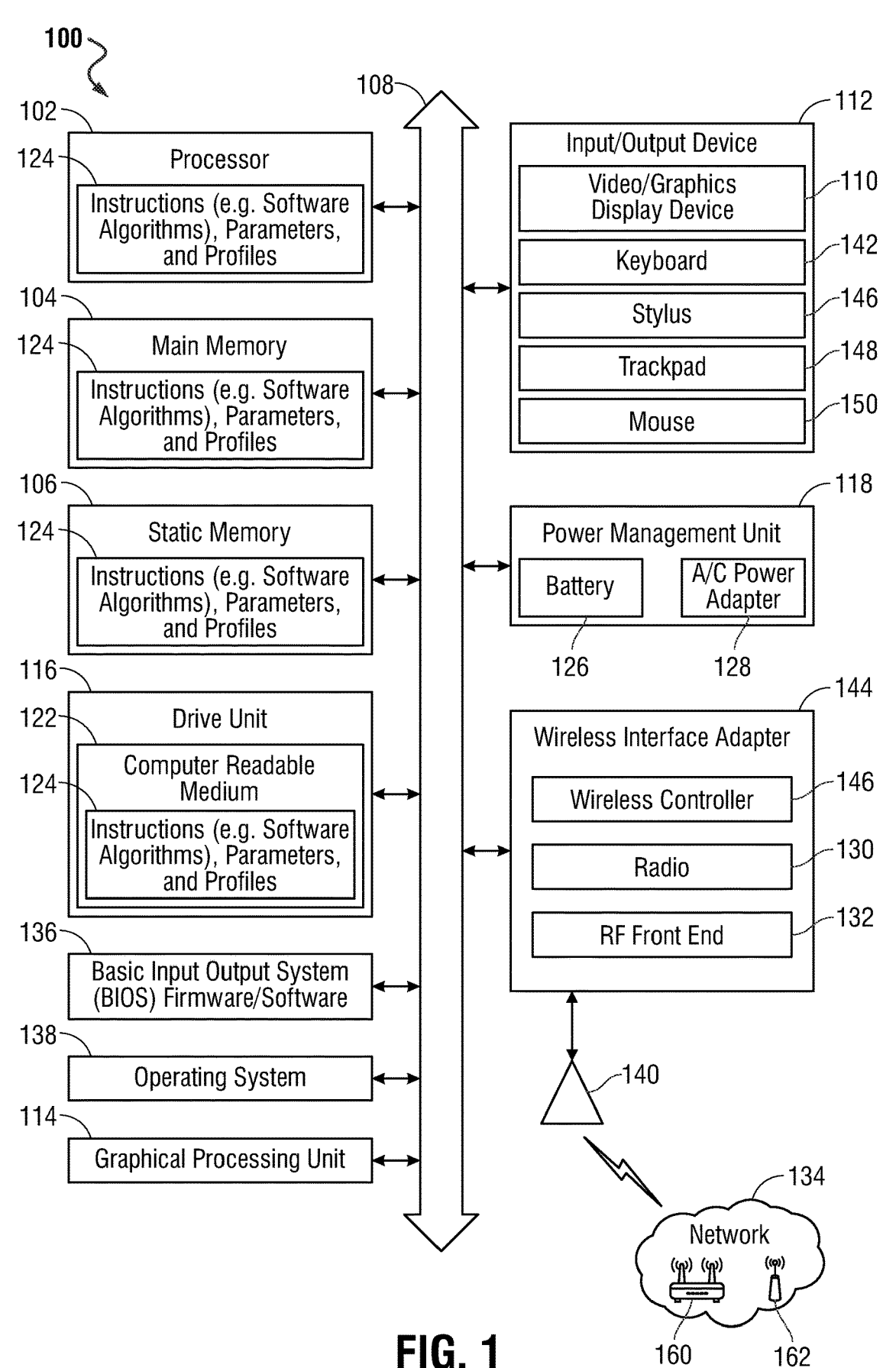
FIG. 1 is a block diagram illustrating an information handling system with an antenna according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

With modern information handling systems including laptop type information handling systems or convertible laptop information handling systems, one or more antennas may be deployed for wireless data communications in any of plural wireless protocol radio systems. Further, many premium information handling systems are deployed with a metal chassis for aesthetic reasons as well as strength and durability. With such plural wireless protocol radio systems, locating antennas in the chassis of the information handling systems may be a challenge, particularly with aesthetic design choices for narrow border bezels and smaller product dimensions. Embodiments of the present disclosure provide for a system and method for utilizing the space occupied by a pivoting hinge structure with a first rotation shaft for the hinge within a horseshoe-shaped hinge cavity in the edge frame of a base chassis of an information handling system. A gap in the horseshoe-shaped hinge cavity may be used with an antenna disposed on an integrated horseshoe hinge frame antenna holder for transmission and reception of radiofrequency signals. In example embodiments of the present disclosure, the antenna may be formed on the horseshoe hinge frame antenna holder, where the body of the horseshoe hinge frame antenna holder is made of a radio frequency transparent material. The horseshoe hinge frame antenna holder may be integrated into a recess or horseshoe-shaped hinge cavity of the edge frame of a base chassis to frame out a space for the hinge structure that accommodates hinge rotation to provide for a convertible laptop functionality. The horseshoe hinge frame antenna holder may be shaped such that some or all of the antenna etched on a surface of the horseshoe hinge frame antenna holder may face into a cavity for the hinge structure such that the cavity may be used for transmission and reception of radiofrequency signals. Further, hinge structure hinge caps may be metallic to provide for reflection of radiofrequency signals in various configurations of the convertible laptop information handling system to assist in transmission or reception of radiofrequency signals from a gap in the hinge cavity. The horseshoe hinge frame antenna holder and the antenna may be operatively coupled under the top cover or c-cover of a base chassis in an embodiment. The metallic top cover may have a rubber display foot or a display foot of other radiofrequency transparent material in a slot in the metallic top cover to assist with transmission or reception upward from the top cover and protect a display screen. The display foot also protects a display screen when the information handling system is in a closed orientation. Similarly, a bottom cover or d-cover of the base chassis may include a rubber tabletop bumper or other tabletop bumper of another radiofrequency transparent material in a slot in the bottom cover to assist in transmission or reception from a bottom side of the base chassis as well as serve to protect the bottom of the information handling system from sliding on or scratching tabletop surfaces.

In the context of the present specification, the information handling system may be any type of information handling system that includes a display chassis and a base chassis such as a 360-degree laptop type information handling system. In these embodiments, the chassis of the information handling system may include a display housing that includes an "a-cover" which serves as a back cover for the display housing and a "b-cover" which may serve as the bezel for a display screen of the information handling system such as a laptop information handling system. In this example embodiment, this laptop information handling system may have a chassis that forms a base chassis. The base chassis includes top cover or a "c-cover" housing a keyboard, touchpad, speaker grill, and any other components set into the c-cover. The base chassis may include a bottom cover or a "d-cover" housing a processing device, memory the PMU, wireless interface adapter and other components of the information handling system in the base chassis for the laptop information handling system. In the example embodiments described herein, the horseshoe hinge frame antenna holder and antenna may be integrated into a cavity and space recessed into an edge of the base chassis where a hinge structure is also installed. The hinge structure may be an articulated hinge that operatively couples the base chassis to a display chassis to enable multiple orientations for the information handling system. The antenna disposed on the horseshoe hinge frame antenna holder allows use of the gap in the horseshoe-shaped hinge cavity at the base chassis edge instead of placing these antenna components elsewhere in locations of the base chassis or display chassis. This allows placement of antennas at the hinges that permits a greater metallic portion of the base chassis or display chassis, may decrease the sizes (e.g., thickness or bezel size) of the base chassis or display chassis or provide for space in those chassis to be used for other components.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with a head-mounted display 120 and provide data storage resources, processing resources, and/or communication resources to the head-mounted display 120 as described herein. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as the processor 102, a central processing unit (CPU), a graphics processing unit (GPU) 114, accelerated processing unit (APU), a microprocessor, a microcontroller, a digital signal processor (DSP), a vision processing unit (VPU), an application specific integrated circuit (ASIC), a reduced instruction set computer (RISC), a complex instruction set computer (CISC), a super scalar processor, or any combination thereof. Any of the processing resources may operate to execute code that is either firmware or software code. Additional components of the information handling system 100 can include one or more storage devices such as a main memory 104, static memory 106, computer readable medium 122 storing instructions 124 of one or more software or firmware applications, and drive unit 116 (volatile (e.g., random-access memory, etc.), nonvolatile (read-only memory, flash memory etc.) or any combination thereof). In an embodiment, the information handling system 100 may include one or more communications ports for communicating with external devices, as well as various input and output (I/O) devices 112. The information handling system 100 can also include one or more buses 108 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 124 via one or more processing resources that may operate on servers or systems, remote data centers, or on-box in individual client information handling systems according to various embodiments herein. In some embodiments, it is understood any or all portions of code instructions 124 may operate on a plurality of information handling systems 100.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include one or more input/output devices 112 including an alpha numeric input device such as a keyboard 142 and/or a cursor control device, such as a mouse 150, touchpad/trackpad 148, a stylus 146, or a gesture or touch screen input device associated with the video display device 110.

The network interface device shown as wireless interface adapter 144 can provide connectivity to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 160 or base station 162 used to operatively coupled the information handling system 100 to a network 134. In a specific embodiment, the network 134 may include macrocellular connections via one or more base stations 162 or a wireless access point 160 (e.g., Wi-Fi), or such as through licensed or unlicensed WWAN small cell base stations 162. Connectivity may be via wired or wireless connection. For example, wireless network access points 160 or base stations 162 may be operatively connected to the information handling system 100 via one or more wireless protocols operating on radio subsystems 130. The wireless interface adapter 144 may include one or more radio frequency (RF) subsystems (e.g., radio 130) with transmitter/receiver circuitry, modem circuitry, one or more antenna front end circuits 132, one or more wireless controller circuits 146, amplifiers, antennas 140 and other circuitry of the radio 130 such as one or more antenna ports used for wireless communications via multiple radio access technologies (RATs). The radio 130 may communicate with one or more wireless technology protocols. In and embodiment, the radio 130 may contain individual subscriber identity module (SIM) profiles for each technology service provider and their available protocols for any operating subscriber-based radio access technologies such as cellular LTE communications. Antennas 140 may include any antenna or metallic structure of the information handling system that may receive or transmit a radiofrequency signal generated by the radio subsystems 130. For example, antenna 140 may be an antenna etched onto a radiofrequency transparent antenna holder such as a horseshoe hinge frame antenna holder according to embodiments herein. The horseshoe hinge frame antenna holder and antenna is integrated into the top cover frame of a base chassis of an information handling system at a hinge structure cavity according to embodiments herein. The horseshoe hinge frame antenna holder and antenna may be operatively coupled to the RF front end 132, radio subsystem 130 of the wireless interface adapter 144 with a radio feed via on the horseshoe hinge frame antenna holder that is coupled to the etched antenna. In an embodiment, the antenna etched on the horseshoe hinge frame antenna holder may be a planar inverted F antenna (PIFA) capable of transceiving at one or more frequency ranges. In other embodiments, it is contemplated that other antenna types may be etched to the horseshoe hinge frame antenna holder including monopole antennas, loop antennas, or other antenna structures. Plural horseshoe hinge frame antenna holder with plural antennas may be deployed on the information handling system 100 at various hinge cavity locations in some embodiments. Further, in some embodiments, the antenna or antennas 140 deployed on a horseshoe hinge frame antenna holder may work with one or radio subsystems 130 while plural other antennas 140 deployed in other locations on the information handling system may work with the same or different radio subsystems 130.

In an example embodiment, the wireless interface adapter 144, radio 130, and antenna 140 may provide connectivity to a one or more of the peripheral devices that may include a wireless video display device 110, a wireless keyboard 142, a wireless mouse 150, a wireless headset (not shown), a wireless stylus 146, and a wireless trackpad 148 among other wireless peripheral devices used as input/output (I/O) devices 112. In an embodiment, any wireless peripheral devices may wirelessly couple with Bluetooth radio protocols. In other embodiments, wireless interface adapter 144, radio 130, and antenna 140 may operate with Wi-Fi 802.11 radio protocol, 5G NR radio protocols, or other wireless protocols to operatively couple the information handling system 100 to the network 134. In an embodiment, an antenna controller 146 operatively coupled to an operating system (OS) 138 may concurrently transceive data via one or more wireless protocols of the radio subsystems 130 available in one or more wireless interface adapters 144.

As described, the wireless interface adapter 144 may include any number of antennas 140 which may include any number of tunable antennas for use with the system and methods disclosed herein. Although FIG. 1 shows a single antenna 140, the present specification contemplates that the number of antennas 140 may include more or less of the number of individual antennas shown in FIG. 1. Additional antenna system modification circuitry (not shown) may also be included with the wireless interface adapter 144 to implement coexistence control measures via an antenna controller as described in various embodiments of the present disclosure.

The wireless interface adapter 144 can represent an add-in card, wireless network interface module that is integrated with a main board of the information handling system or integrated with another wireless network interface capability, or any combination thereof. In an embodiment the wireless interface adapter 144 may include one or more radio frequency subsystems including transmitters and wireless controllers for connecting via a multitude of wireless links. In an example embodiment, an information handling system 100 may have an antenna system transmitter for 5G small cell WWAN, Wi-Fi WLAN connectivity and one or more additional antenna system transmitters for macrocellular communication. The RF subsystems and radios 130 include wireless controllers to manage authentication, connectivity, communications, power levels for transmission, buffering, error correction, baseband processing, and other functions of the wireless interface adapter 144.

The information handling system 100 can include a set of instructions 124 that can be executed to cause the computer system to perform any one or more of the methods or computer-based functions disclosed herein. For example, instructions 124 may execute various software applications, software agents, or other aspects or components that may operate on the information handling system 100. Various software modules comprising application instructions 124 may be coordinated by an operating system (OS) 138, and/or via an application programming interface (API). An example OS 138 may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 such as a CPU, or other processing resources such as processing resource 165 to perform the methods described herein. Similarly, main memory 104 and static memory 106 may also contain a computer-readable medium for storage of one or more sets of instructions, parameters, or profiles 124 described herein. The disk drive unit 116 or static memory 106 also contain space for data storage. Further, the instructions 124 may embody one or more of the methods or logic as described herein. In a particular embodiment, the instructions, parameters, and profiles 124 may reside completely, or at least partially, within the main memory 104, the static memory 106, and/or within the disk drive 116 during execution by the processor 102 or GPU 114 of information handling system 100 or processing resource 165 of the handheld controller 152. The main memory 104, static memory 106, or processing resources 102, GPU 114, or processing resources 165 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding, or carrying a set of instructions for execution by a processor or that cause a computer system to perform any one or more of the methods or operations disclosed herein.

In an embodiment, the information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device 110 or other input/output devices 112 such as the stylus 146, and other components that may require power when a power button has been actuated by a user. In an embodiment, the PMU 118 may monitor power levels and be electrically coupled, either wired or wirelessly, to the information handling system 100 to provide this power and coupled to bus 108 to provide or receive data or instructions. The PMU 118 may be coupled to the antenna controller to control the wireless radio 130 of the information handling system 100 as described herein. The PMU 118 may regulate power from a power source such as a battery 126 or A/C power adapter 128. In an embodiment, the battery 126 may be charged via the A/C power adapter 128 and provide power to the components of the information handling system 100 via a wired connections as applicable, or when A/C power from the A/C power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In various embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
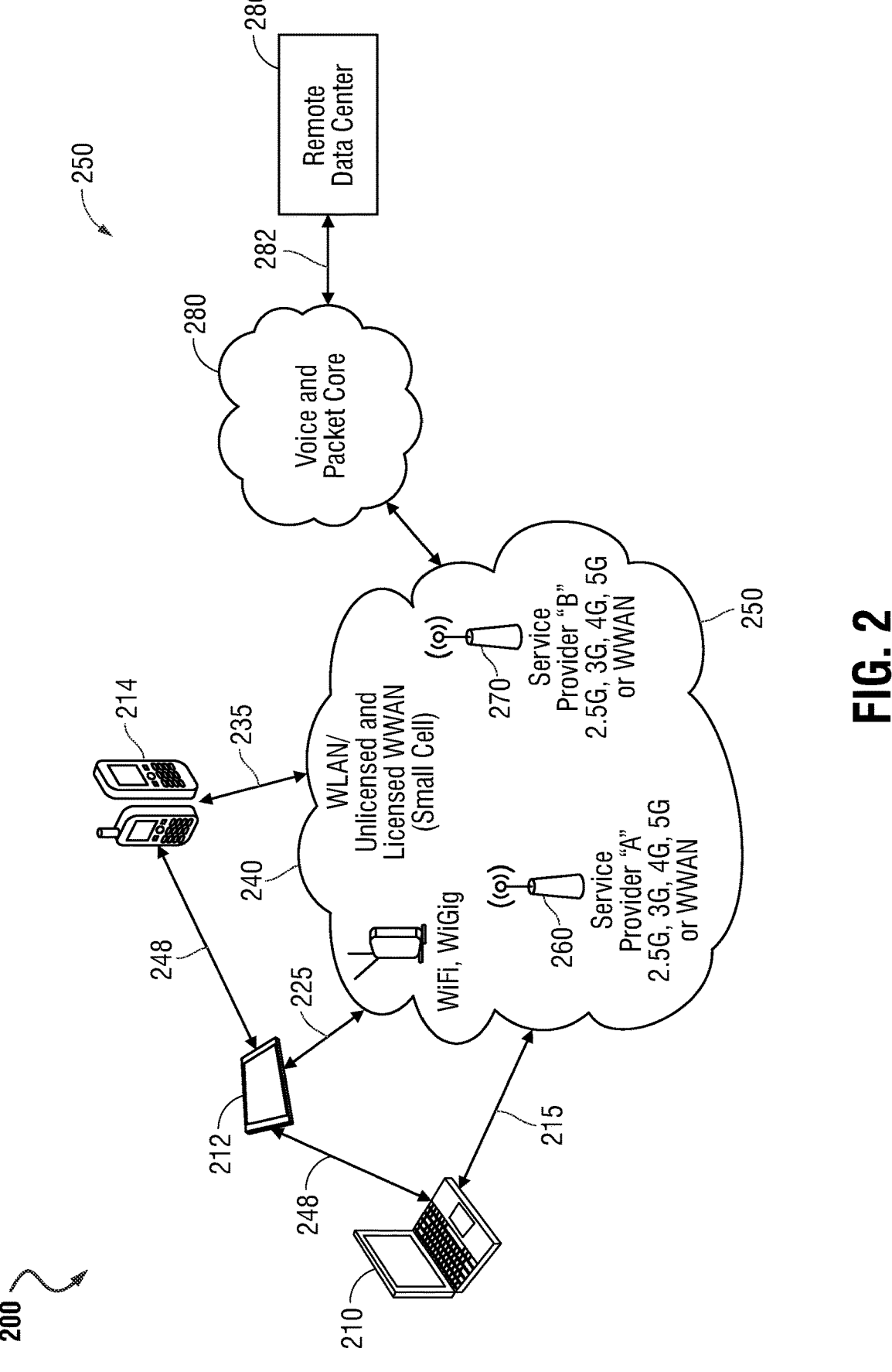
FIG. 2 is a block diagram of a network environment offering several communication protocol options and mobile information handling systems according to an embodiment of the present disclosure.

FIG. 2 illustrates a network 200 that can include one or more information handling systems 210, 212, 214. The information handling systems 210, 212, 214 shown in FIG. 2 may be similar to the information handling system 100 described in connection with FIG. 1, respectively. For example, any of the information handling systems may utilize one or more antenna systems with the horseshoe hinge frame antenna holder and antenna of embodiments herein. In a particular embodiment, network 200 includes networked mobile information handling systems 210, 212, 214, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 212, 214 may be a laptop computer, tablet computer, 360-degree convertible systems, wearable computing devices, or a smart phone device. These information handling systems 210, 212, 214, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. Plural horseshoe hinge frame antenna holders and plural antennas may be deployed on information handling systems 210, 212, or 214 and located at base chassis hinge cavities to communicate wirelessly via WLAN 240, WWAN 250 or other wireless network connections according to embodiments herein.

Since WPAN or Wi-Fi Direct connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points (e.g., 160 FIG. 1) or base stations (e.g., 162, FIG. 1) may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, peripheral telemetry data, and antenna mounting locations (e.g., spatial locations of antennas within the information handling system) associated with each information handling systems 210, 212, 214 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 240, 250 may be based on the radio access network (RAN) standards that implement, for example, eNodeB or gNodeB hardware connected to mobile phone networks (e.g., cellular networks) used to communicate with the information handling systems 210, 212, and 214. In the example embodiment, mobile one or more information handling systems 210, 212, 214 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling systems 210, 212, 214 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments, a networked mobile information handling system 210, 212, and 214 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling systems 210, 212, or 214 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile information handling system 210, 212, 214 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a N×N MIMO array configuration according to the embodiments described herein. Alternatively, embodiments may include a single transceiving antennas capable of receiving and transmitting, and/or more than one transceiving antennas. Each of the antennas included in the information handling systems 210, 212, and 214 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 212, 214, or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more information handling systems 210, 212, or 214. Alternatively, mobile information handling systems 210, 212, or 214 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 212, and 214 allowing streamlining and efficiency within those devices. In an embodiment, the remote information management system 288 may be part of a 5G multi-edge compute server placed at an edge location on the network 200 for access by the information handling systems 210, 212, and 214. In an embodiment, the remote data center 286 permits fewer resources to be maintained in other parts of network 200.

Although communication links 215, 225, and 235 are shown connecting wireless adapters of information handling systems 210, 212, 214 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile information handling systems 210, 212, 214 may communicate intra-device via intercommunication links 248 when one or more of the information handling systems 210, 212, 214 are set to act as an access point or even potentially an WWAN connection via small cell communication on licensed or unlicensed WWAN connections. For example, one of mobile information handling systems 210, 212, 214 may serve as a Wi-Fi hotspot in an embodiment. Concurrent wireless links to information handling systems 210, 212, 214 may be connected via any access points including other mobile information handling systems as illustrated in FIG. 2.

Figure 3:
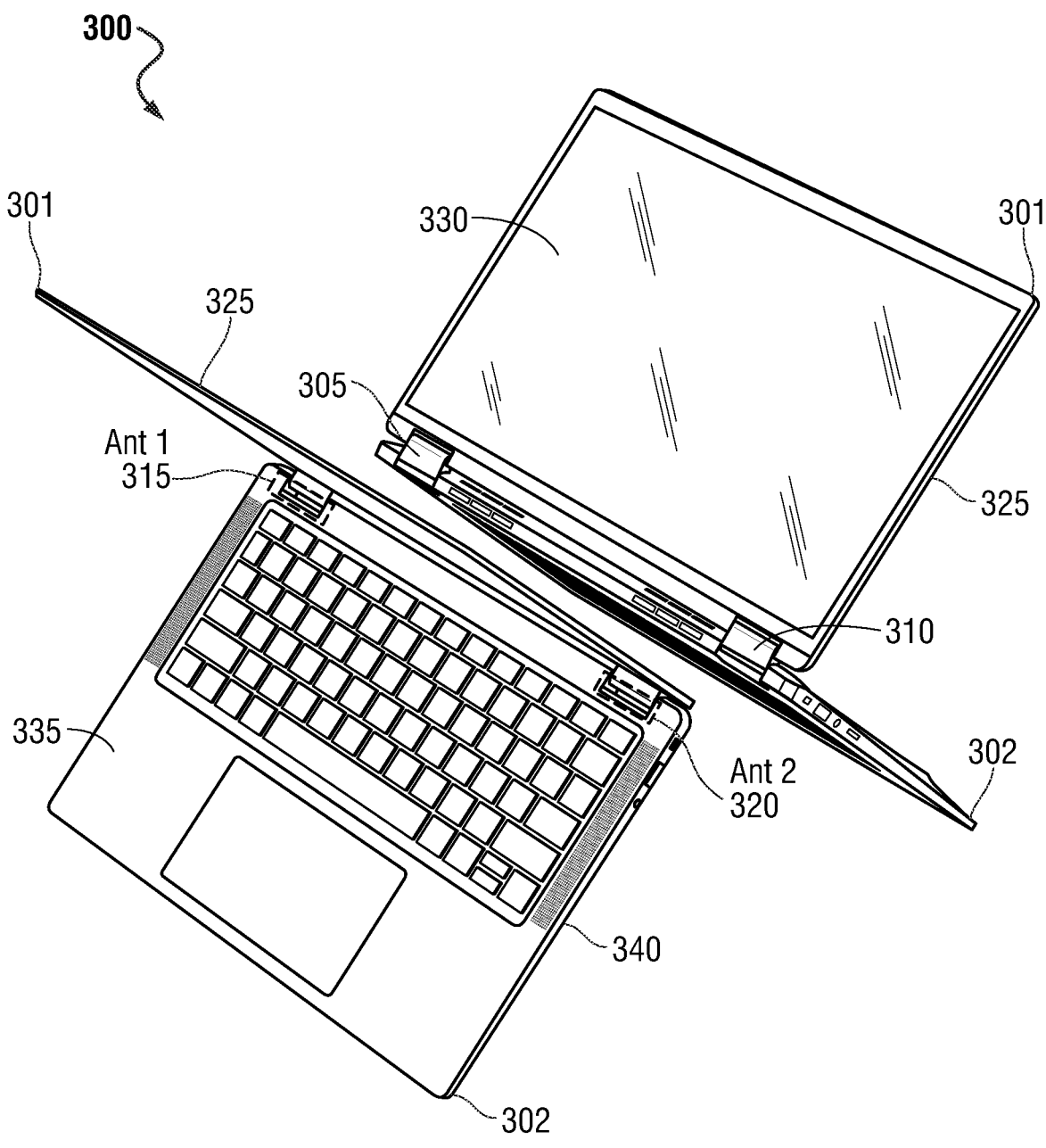
FIG. 3 is a perspective view of an information handling system showing plural configurations and including a hinge structure with location of one or more antennas according to an embodiment of the present disclosure.

FIG. 3 is an information handling system 300 according to an embodiment of the present disclosure. In the embodiment shown, the information handling system 300 is a convertible laptop type information handling system shown in two orientations. The first orientation illustrates a laptop orientation, and the second orientation illustrates a display orientation both of which show a partial range of motion of hinges 305 and 310 to articulate the display chassis 301 with respect to the base chassis 302 from a closed orientation to a tablet orientation according to the embodiments described herein. The hinge structures 305 and 310 may operatively couple the display chassis 301 with the base chassis 302 and may include power cabling or other coupling, communication cabling or other coupling, as well as a mechanical coupling between the display chassis 301 and the base chassis 302. In embodiments herein, hinge structures 305 and 310 may be any hinge that permits up to 360 degrees of rotation of a display chassis relative to a base chassis for a convertible laptop type information handling system 300. In an embodiment, hinge structures 305 and 310 may be an articulated hinge to provide a wider sweep of rotation for a display chassis relative to a base chassis for the convertible laptop type information handling system 300 to allow the display chassis to lay flat on the base chassis in either a close orientation or a tablet orientation.

The display chassis 301 may include a back cover or a-cover 325 and a bezel and display or b-cover 330 in an embodiment. As described herein, such a display chassis 301 is designed to be very thin and often the a-cover 325 is comprised of metal for aesthetic reasons. Further, the bezel width around the display of b-cover 330 is designed to be a small as can be accommodated in some embodiments for aesthetic reasons.

The base chassis 302 includes a top cover or c-cover 335 which may include a keyboard, touchpad, and other keys and buttons thereon. The base chassis 302 also includes a bottom cover or d-cover 340 which frequently houses many of the internal components of the information handling system 300 with the a-cover 335 to form base chassis 302. These information handling system components may include several of those described in FIG. 1 such as processing resources, memory and data storage, power systems and control, a motherboard or graphics systems, or a wireless interface device, among several others. The base chassis 302 is also designed to be thin and compact in many modern information handling systems and further some or all of the c-cover and d-cover may be comprised of metal for aesthetic and functional reasons as described herein.

For the display chassis 301 to be able to rotate with respect to the base chassis 302 from a closed orientation to a tablet orientation, hinges 305 and 310 articulate such that a rotation of at 360 degrees or up to approximately 360 degrees may be achieved. For example, up to approximately 360 degrees may come within 10 degrees of a full 360 degrees in an example embodiment. This rotation of the display chassis 301 relative to the base chassis 302 via the one or more hinges is available for configuring the information handling system 300 in any of several orientations in embodiments herein. To articulate to such a degree, hinges 305 and 310 have articulated pivot shafts in an embodiment that are operatively coupled to the display chassis 301 along a bottom edge and set into corresponding a frame edge of the base chassis 301. Such a hinge structure 305 and 310 in an embodiment may be referred to as an articulated hinge. For articulation, hinges 305 and 310 are set into a horseshoe-shaped hinge cavity of the frame edge of the base chassis 302 as described in embodiments herein. For articulation, the horseshoe-shaped hinge cavity has some space to allow hinges 305 and 310 to rotate during changes in configuration. This space allows for rotation and further has a gap that may be used to provide a via for radiofrequency signal transmission or reception from the largely metallic base chassis 302 in embodiments herein.

According to embodiments herein and described or shown below, the horseshoe-shaped hinge cavity into which a portion of the hinge 305 or 310 is set in the edge of the base chassis 302 is a cavity or indented portion of the edge of the base chassis to receive a portion of hinge 305 or 310. In other embodiments, the horseshoe-shaped hinge cavity may be generally horseshoe shaped, u-shaped, v-shaped, irregularly shaped, or otherwise a shape forming a space extending internal to the base chassis from the edge. The horseshoe-shaped hinge cavity further may include squared, angled, or rounded corners in the indentation from the edge of the base chassis 301 for receiving a portion of the hinge structures 305 or 310.

This horseshoe-shaped hinge cavity and space is utilized according to embodiments of the present disclosure to locate antennas at location 315 and 320 with a horseshoe hinge frame antenna holder having an etched antenna or antennas thereon as shown at locations 315 and 320. The horseshoe hinge frame antenna holders and antennas at locations 315 and 320 are operatively coupled to provide an antenna that may radiate or receive radio frequencies into the horseshoe-shaped hinge cavity in a gap in the space for the hinges 305 and 310 respectively in an embodiment. Further, in some embodiments the structure of the articulated hinges 305 and 310 may include aesthetic hinge caps made of metal and that assist in reflecting radiofrequencies out of or into the horseshoe-shaped hinge cavity in some orientations of information handling system 300. Additionally, a rubber or other radiofrequency transparent material may be used for a display footing on c-cover 335 to protect a display when in closed orientation or serve as a tabletop bumper for c-cover 335 in a tablet or display orientation. A rubber or other radiofrequency transparent material may be used for a tabletop bumper on the bottom of d-cover 340 for protecting the bottom of the base chassis from sliding or scratching a tabletop when resting on a tabletop. These rubber or other radiofrequency transparent materials for a display foot or a tabletop bumper may be set into the metal c-cover 335 or metal d-cover 340 respectively via a slit or other aperture in the metal in an embodiment. As such, this opening for the display foot or the tabletop bumper may further assist the horseshoe hinge frame antenna holders and antennas at locations 315 and 320 to transmit or receive radiofrequency signals in various orientations of the information handling system 300 according to embodiments herein.

Figure 4:
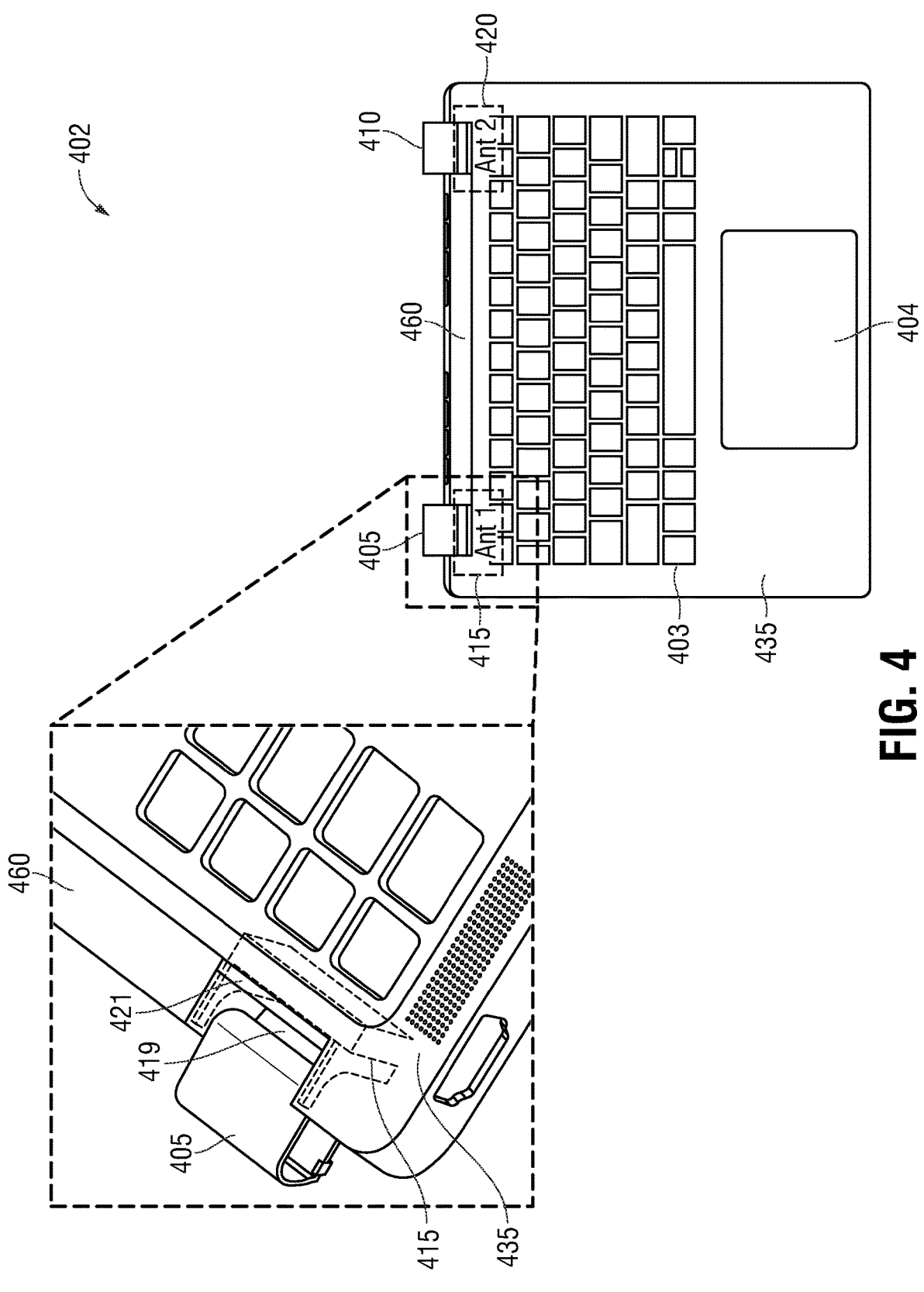
FIG. 4 is a top view with a closeup perspective top view of a base chassis and hinge structure according to an embodiment of the present disclosure.

FIG. 4 is a top view of a base chassis 402 with a close-up perspective view of a horseshoe-shaped hinge cavity 419 with transmission/reception gap according to an embodiment of the present disclosure. This base chassis 402 may be made of partially or wholly metal such that it has a metallic top cover or c-cover 435. The metallic c-cover 435 may include opening for keys of a keyboard 403 and openings for a touchpad 404 and other structures to be set in the c-cover 435.

Base chassis 402 may be operatively coupled to hinges structures 405 and 410 at two locations, although any number of hinges are contemplated in the present embodiments. Hinge structures 405 and 410 are shown with metal caps as can be seen in the close-up perspective view of hinge structure 405. At the location of the horseshoe-shaped hinge cavity, such as 419, one or more horseshoe hinge frame antenna holders may be located with antennas 415 and 420 etched thereon along a frame edge 460 of the base chassis 401. According to embodiments herein and described or shown below, the horseshoe-shaped hinge cavity 419 into which a portion of the hinge 405 or 410 is set in the edge 460 of the base chassis 402 is a cavity or indented portion of the edge 460 of the base chassis 402. The horseshoe-shaped hinge cavity 419 is an indentation to receive a portion of hinge 405 or 410 to permit rotation of the display chassis (not shown) relative to the base chassis 402 for a convertible type laptop information handling system. In other embodiments, the horseshoe-shaped hinge cavity may be generally horseshoe shaped, u-shaped, v-shaped, irregularly shaped, or otherwise a shape forming a space extending internal to the base chassis 402 from the edge 460 that is adjacent to the display chassis coupled to the base chassis 402 with hinges 405 or 410. The horseshoe-shaped hinge cavity of the shown embodiment includes squared corners but may further include squared, angled, or rounded corners in various embodiments in the indentation from the edge 460 of the base chassis 401 for receiving a portion of the hinge structures 405 or 410.

The hinge structure 405 may include a shaft for articulation that is set across the horseshoe-shaped hinge cavity 419 while leaving a gap for transmission and reception by the horseshoe hinge frame antenna holder and antenna at location 415 as shown in the close-up perspective view. As detailed in embodiments herein, the horseshoe hinge frame antenna holder and antenna at location 415 or 420 is integrated around the horseshoe-shaped hinge cavity 419 of the frame edge 460 of the base chassis 402 and the antenna may be etched on any surface around the horseshoe-shaped hinge cavity 419 as described in embodiments herein.

Figure 5:
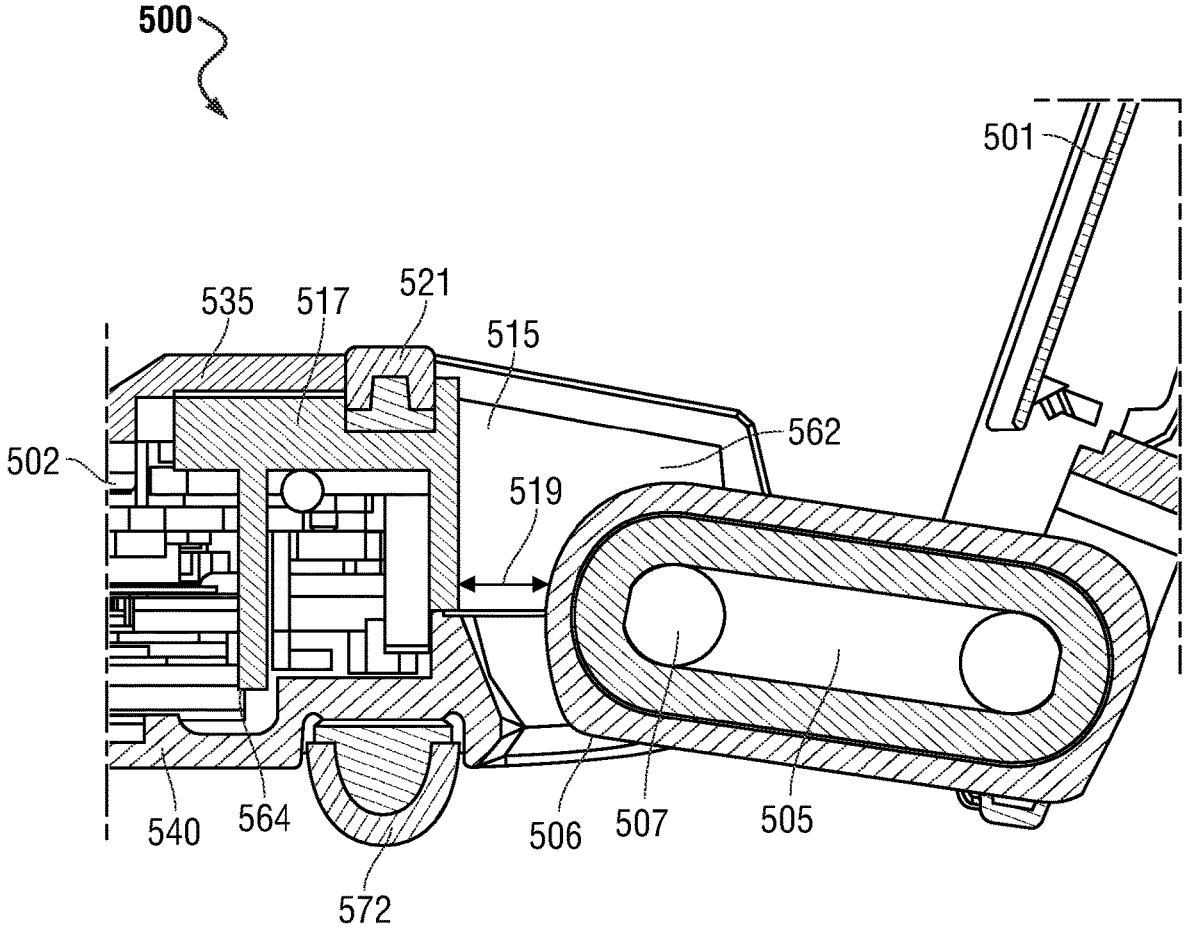
FIG. 5 is a side cutaway view of a horseshoe hinge frame antenna holder and antenna configured with a hinge structure of an information handling system according to an embodiment of the present disclosure.

FIG. 5 is a side cutaway view an information handling system 500 with a horseshoe hinge frame antenna holder 517 and antenna 515 operatively coupled to a base chassis 502 at a frame edge hinge cavity 519 according to an embodiment of the present disclosure. As shown, the hinge 505 is operatively coupled between the display chassis 501 and base chassis 502. Base chassis 502 may include a metallic top cover or c-cover 535 and metallic bottom cover or d-cover 540. Hinge 505 is shown as an articulated hinge capable of up to 360 degrees of movement between the display chassis 501 and base chassis 502 by virtue of plural hinge shafts. As shown in FIG. 5, hinge shaft 507 is set into the base chassis 502 at a horseshoe-shaped hinge cavity 519, shown in cutaway, with space to allow hinge 505 to articulate with the horseshoe-shaped hinge cavity 519 and a gap to permit transmission and reception of radiofrequency signals in an embodiment. Further, the horseshoe hinge frame antenna holder 517 borders the inside of the horseshoe-shaped hinge cavity 519 in the base chassis 502 frame edge in such that a portion of antenna 515 faces into horseshoe-shaped hinge cavity 519 and the hinge 505 with hinge cap 506 located there. The horseshoe hinge frame antenna holder 517 is mounted under the top cover or c-cover 535 of base chassis 502 in an embodiment. Hinge shaft 507 spans and is mounted across the horseshoe-shaped hinge cavity 519 going into and out of the cutaway view of FIG. 5. The horseshoe hinge frame antenna holder 517 includes peninsular holder sides 562, only one of which is shown in the cutaway view, around the horseshoe-shaped hinge cavity 519 and which are shaped by taper and curvature to accommodate the hinge shaft 507. Hinge 505 may include a metallic hinge cap 506 that covers the hinge structure including hinge shaft 507. Hinge cap 506 may reflect radiofrequency waves from antenna 515 etched on a surface of, such as on an outer-facing wall of the horseshoe hinge frame antenna holder 517 to facilitate transmission or reception up or down from the gap of the horseshoe-shaped hinge cavity 519.

Additional features of the horseshoe hinge frame antenna holder 517 may be seen in FIG. 5 as well. Shielding wall 564, display foot 521, and base chassis tabletop bumper 572 are shown integrated with the horseshoe hinge frame antenna holder 517 in the base chassis 502. The shielding wall 564 may be made of radiofrequency transparent material such as plastic and be formed as part of the body of the horseshoe hinge frame antenna holder 517, but may include a metallic or other conductive layer affixed, etched, disposed or otherwise formed along the vertical shielding wall 564. The shielding wall 564 is implemented to protect from interference to the antenna structures 515 as well as to protect radio frequency sensitive circuits internal to the base chassis 502 from antenna structures 515. In example embodiments, the metallic layer on the shielding wall 564 may include a foil, a conductive gasket, or may be an etched or deposited layer formed on the horseshoe hinge frame antenna holder 517 which reflects radiofrequency signals.

The display foot 521 may be made of a radiofrequency transparent material and installed through an aperture in metallic c-cover 535 located over the antenna 515 and operatively coupled to the horseshoe hinge frame antenna holder 517 in an embodiment. In an example embodiment, the display foot 521 may be made of a rubber material and useful to cushion the display screen of the display chassis from contacting the c-cover 535 and any keyboard thereon in a closed orientation. The display foot 521 may also serve as a tabletop bumper to protect the c-cover 535 and any keyboard or touchpad thereon from a tabletop in display orientation or tablet orientation of the information handling system 500. Further, because the display foot 521 is comprised of a radiofrequency transparent material, the one or more antennas 515 etched on onto the horseshoe hinge frame antenna holder 517 may transmit/receive up through the aperture with the display foot 521 in an embodiment as well as from/to the horseshoe-shaped hinge cavity 519.

The tabletop bumper 572 may also be made of a radiofrequency transparent material and installed through an aperture in metallic d-cover 540 located under the antenna 515 and the horseshoe hinge frame antenna holder 517 in another embodiment. In an example embodiment, the tabletop bumper 572 may be made of a rubber material and useful to cushion the base chassis 502 from contacting, sliding, or scratching a table surface when resting on a table. Further, because the tabletop bumper 572 is comprised of a radiofrequency transparent material, the one or more antennas 515 etched on onto the horseshoe hinge frame antenna holder 517 may transmit/receive down through the aperture in the d-cover 540, if any, and the tabletop bumper 572 in an embodiment as well as from/to the horseshoe-shaped hinge cavity 519 in various orientations.

Figure 6:
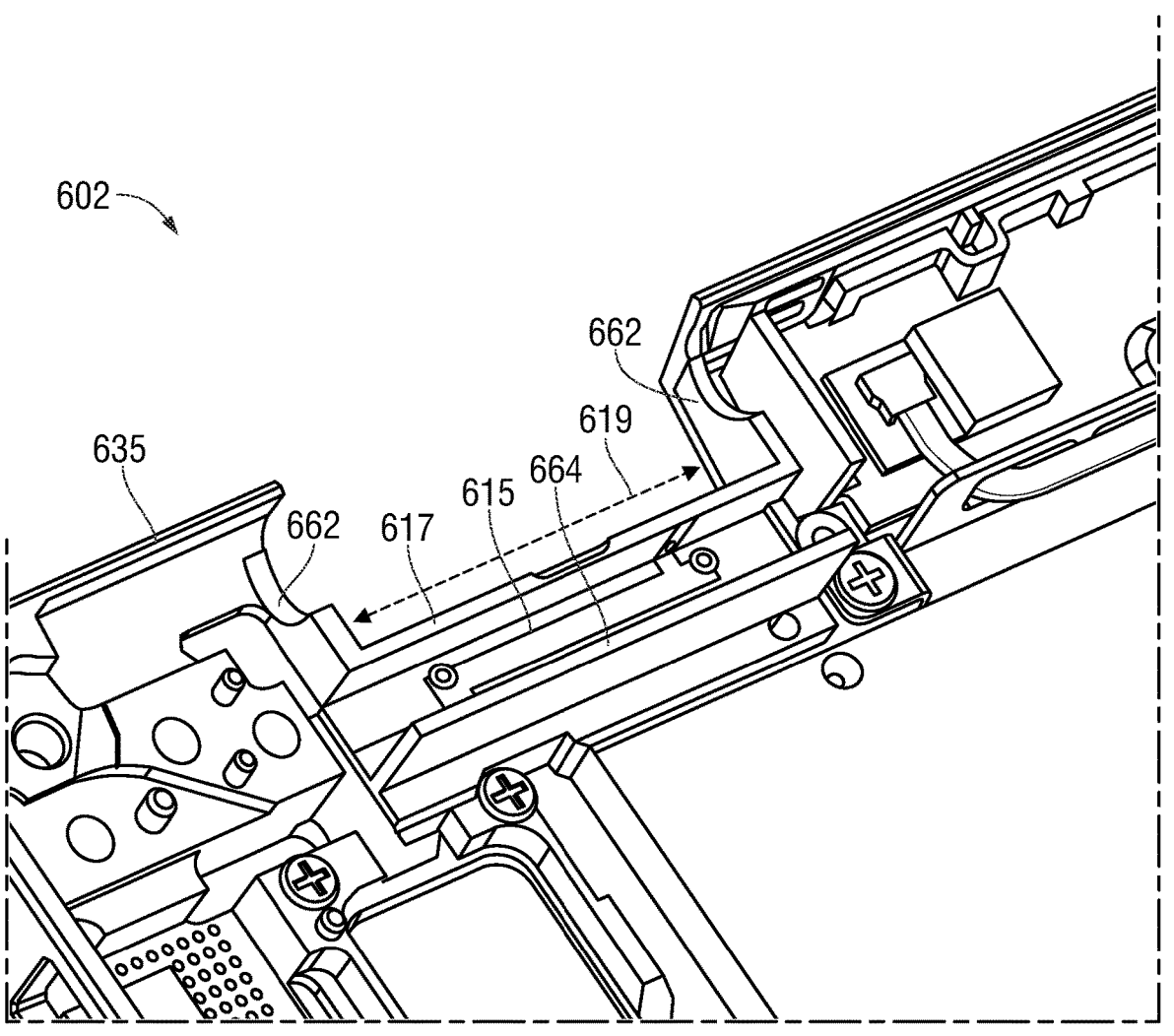
FIG. 6 is a cutaway bottom view of a top cover for a base chassis including a horseshoe hinge frame antenna holder and antenna for an information handling system according to an embodiment of the present disclosure.

FIG. 6 is a bottom cutaway perspective view of the underside of a top cover 635 for a base chassis 602 according to an embodiment of the present disclosure. As described herein, the horseshoe hinge frame antenna holder 617 is operatively coupled underneath the c-cover 635 of a base chassis 602 of an information handling system via a screw or other fastener, via a snap or interference fit with interference fit structures including angled edges or hooks, via glue/adhesives, or via other methods. One or more screws can be seen in the shown embodiment and the horseshoe hinge frame antenna holder 617 may have body edges that snap fit into a space on the underside of the c-cover 635. The horseshoe hinge frame antenna holder 617 has a body formed of a radiofrequency transparent material such as plastic formed by injection molding. The horseshoe hinge frame antenna holder 619 has one or more antennas 615 and antenna vias etched onto the surface of the horseshoe hinge frame antenna holder 617 in various embodiments herein. Laser direct structuring (LDS) may be one example method to etch a conductor on the horseshoe hinge frame antenna holder 617 to form one or more antenna patterns for antenna or antennas 615.

The horseshoe hinge frame antenna holder 617 is integrated into a horseshoe-shaped hinge cavity 619 recessed from the frame edge of the c-cover 635. The horseshoe hinge frame antenna holder 617 is comprised of a molded plastic or other radiofrequency transparent material in an embodiment with the antenna or antennas 615 etched thereon with a conductive material such as copper, gold, aluminum, or another material suitable for forming an antenna. The horseshoe hinge frame antenna holder 617 is formed to frame out at least a portion of the interior edge of the horseshoe-shaped hinge cavity 619 in an embodiment. In the shown embodiment, an outward-facing wall of the horseshoe hinge frame antenna holder 617 is integrated along the internal edge of the horseshoe-shaped hinge cavity 619. This outward facing wall frames a portion of the horseshoe-shaped hinge cavity 619 and may have some portion of the antenna or antennas 615 thereon. Further, the outward facing wall may be painted or otherwise colored with a radiofrequency transparent paint or cover to hide the antenna 615 and horseshoe hinge frame antenna holder 617 within the horseshoe-shaped hinge cavity 619 in some embodiments.

The horseshoe hinge frame antenna holder 617 may further be formed to have one or more peninsular holder sides 662 to frame out additional sides of the horseshoe-shaped hinge cavity 619 an embodiment. In such an embodiment, the peninsular holder sides 662 may form a second and third side around the horseshoe-shaped hinge cavity 619. All sides including the outward facing wall of the horseshoe hinge frame antenna holder 617 and the peninsular holder sides 662 all may accommodate one or more etched antennas 615 or vias used for the antenna 615. The circuits etched on the outer-facing wall, peninsular antenna holders 662, or other portions of the horseshoe hinge frame antenna holder 617 may operate as an antenna and be operatively coupled to a wireless interface adapter and radio internal to the base chassis 602. Further, the peninsular holder sides 662 of the horseshoe hinge frame antenna holder 617 may be shaped to accommodate the hinge shaft of the hinge (not shown). For example, the curved or hook shape may be tapered toward the ends of the peninsular holder sides 662 to accommodate the hinge shaft installation across the horseshoe-shaped hinge cavity and installed within c-cover 635 and the d-cover (not shown).

The horseshoe-shaped hinge cavity 619 may be an indentation or recessed cavity extension extending from an edge of the c-cover 635 towards the interior of the base chassis 602. The horseshoe-shaped hinge cavity 619 may be generally horseshoe shaped or u-shaped with a rounded u-shape, rounded corners, squared corners as shown in the present embodiment, angled corners or may be an irregular horseshoe shape with any of the above. The horseshoe-shaped hinge cavity 619 is a hinge cavity extending inward or indented inward form the edge of the c-cover for receiving a hinge structure such as an articulated hinge and providing a space for securing a hinge shaft across the horseshoe-shaped hinge cavity 619 and allowing rotation of the hinge structure according to various embodiments herein.

The horseshoe hinge frame antenna holder 617 may also be formed to have a shielding wall 664 that may be made of same radiofrequency transparent material such as plastic and integrated as part of the body of the horseshoe-shaped hinge cavity 619 comprised of the same material. The horseshoe hinge frame antenna holder 617 may include a metallic or other layer along an inner or outer side of the vertical shielding wall 664 in an embodiment. The shielding wall 664 is situated to isolate the antenna or antennas 615 from interference from internal components inside the base chassis 602 and to help reflect radiofrequency waves to or from the horseshoe-shaped hinge cavity 619 for transmission or during reception. Similarly, the shielding wall 664 further may protect internal components inside the base chassis 602 from radiofrequency exposure from the antenna structures 615 of the horseshoe hinge frame antenna holder 617. The metallic layer on the shielding wall 664 may include a foil or may be an etched or deposited layer formed on the horseshoe hinge frame antenna holder 617, or may include a gasket with metallic or other material installed thereon which may reflect radiofrequency signals in various embodiments.

Figure 7:
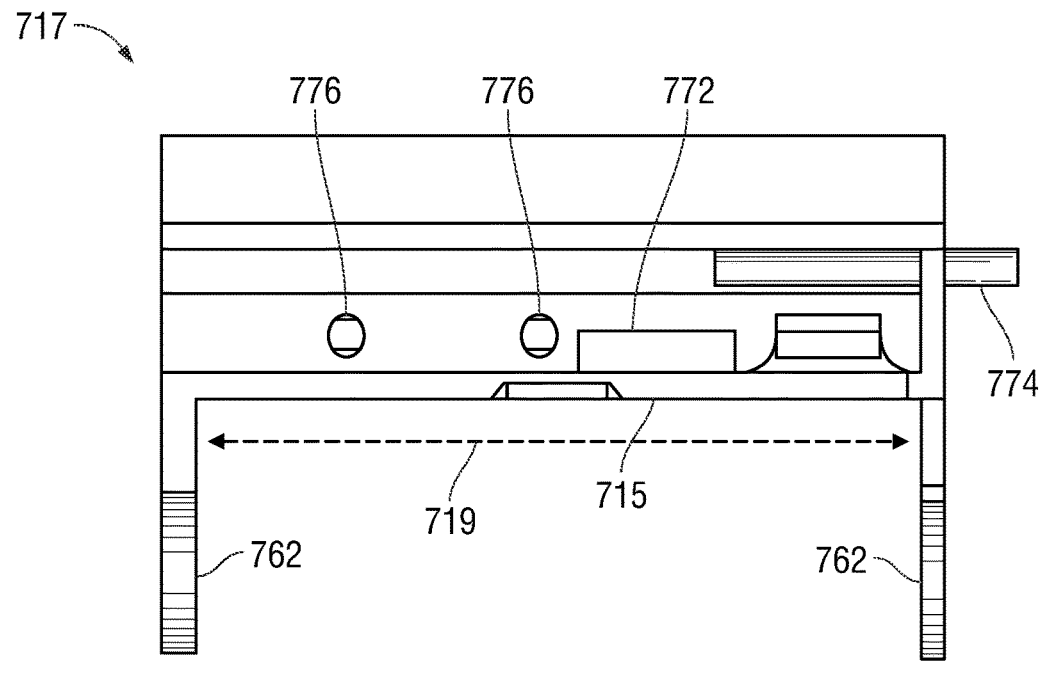
FIG. 7 is a top view of a horseshoe hinge frame antenna holder and antenna according to an embodiment of the present disclosure.

FIG. 7 is a top view of a horseshoe hinge frame antenna holder 717 according to an embodiment of the present disclosure. In the embodiment of FIG. 7, the horseshoe hinge frame antenna holder 717 is viewed from above as it would be installed under the top cover or c-cover of a base chassis of an information handling system. This view includes a view of plural stake holes or posts 776 in the horseshoe hinge frame antenna holder 717 for installation using heat of a display foot, such as a rubber display foot, through an aperture of the c-cover to be affixed to the horseshoe hinge frame antenna holder 717 in an embodiment. The horseshoe hinge frame antenna holder 717 includes an etched antenna feed 772 and a view of a radio frequency cable 774 location for operative coupling to a wireless interface device including RF front end circuitry and a radio according to embodiments herein. The horseshoe hinge frame antenna holder 717 is shown including the horseshoe shape that may frame a horseshoe-shaped hinge cavity 719 that would be disposed at an edge of a frame for a base chassis to frame out a horseshoe-shaped hinge cavity to accommodate a hinge for an information handling system. The horseshoe hinge frame antenna holder 717 includes an inner wall which may have one or more antennas 715 etched thereon and which may be painted or covered to conceal the antenna 715 or horseshoe hinge frame antenna holder 717 within the horseshoe-shaped hinge cavity 719.

The horseshoe hinge frame antenna holder 717 may further be formed to have one or more peninsular holder sides 762 to frame out additional sides of the horseshoe-shaped hinge cavity 719 an embodiment. These peninsular holder sides 762 may also be etched with one or more antennas in an embodiment or with antenna feed or grounding vias for use with antennas of the horseshoe hinge frame antenna holder 717. Similarly, the peninsular holder sides 762 of the horseshoe hinge frame antenna holder 717 may also be painted or covered for aesthetic reasons to conceal them within the horseshoe-shaped hinge cavity 719. In such an embodiment, the peninsular holder sides 762 may form a second and third side around the horseshoe-shaped hinge cavity 719. Additionally, the peninsular holder sides 762 of the horseshoe hinge frame antenna holder 717 may be shaped to accommodate the hinge shaft of the hinge (not shown). For example, a curved or hook shape may taper toward the ends of the peninsular holder sides 762 to accommodate the hinge shaft installation across the horseshoe-shaped hinge cavity in an embodiment.

Figure 8:
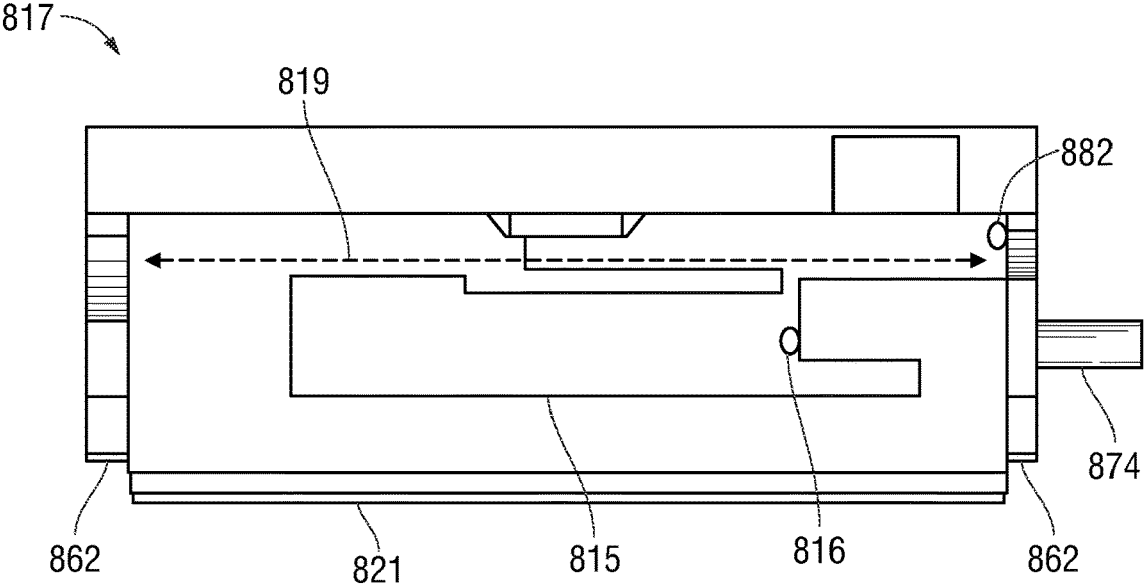
FIG. 8 is an outward side view of a horseshoe hinge frame antenna holder and antenna according to another embodiment of the present disclosure.

FIG. 8 is a side view of horseshoe hinge frame antenna holder 817 viewed looking into the horseshoe-shaped hinge cavity 819 according to another embodiment of the present disclosure. In the embodiment of FIG. 8, the horseshoe hinge frame antenna holder 817 is formed and etched with one or more antennas 815 and antenna feed via 816 and ground via or vias 882 thereon. In the shown embodiment, the antenna pattern 815 serves as an antenna formed on a side of the horseshoe hinge frame antenna holder 817 that may be an outward facing wall at the bottom of the u-shape of the horseshoe-shaped hinge cavity 819. The antenna pattern 815 depicted on the side wall of the horseshoe hinge frame antenna holder 817 forms a PIFA antenna the shown example embodiment, but it is understood that any antenna pattern 815 may be etched onto the side wall or any other surface of the horseshoe hinge frame antenna holder 817 in various embodiments. For example, any portion of an antenna pattern 815 may be etched onto outward facing wall as shown or on peninsular holder sides 862 that extend from the page, or on internal surfaces including horizontal or vertical surfaces of the body of the horseshoe hinge frame antenna holder 817. In other embodiments, it is contemplated that other antenna types may be etched as antenna pattern 815 to the horseshoe hinge frame antenna holder 817 including monopole antennas, loop antennas, or other antenna structures. The peninsular holder sides 862 may be tapered and shaped to accommodate a hinge structure for installation within the horseshoe-shaped hinge cavity 819 according to various embodiments herein. The peninsular holder sides 862 may further be etched with one or more antennas, vias or other structures to provide further wireless capability on the horseshoe hinge frame antenna holder 817 depicted in FIG. 8. One or more antennas 815 may be operatively coupled to an RF front end and radio of a wireless interface device via an RF cable 874 and one or more antenna feed vias 816 according to embodiments herein.

Figure 9:
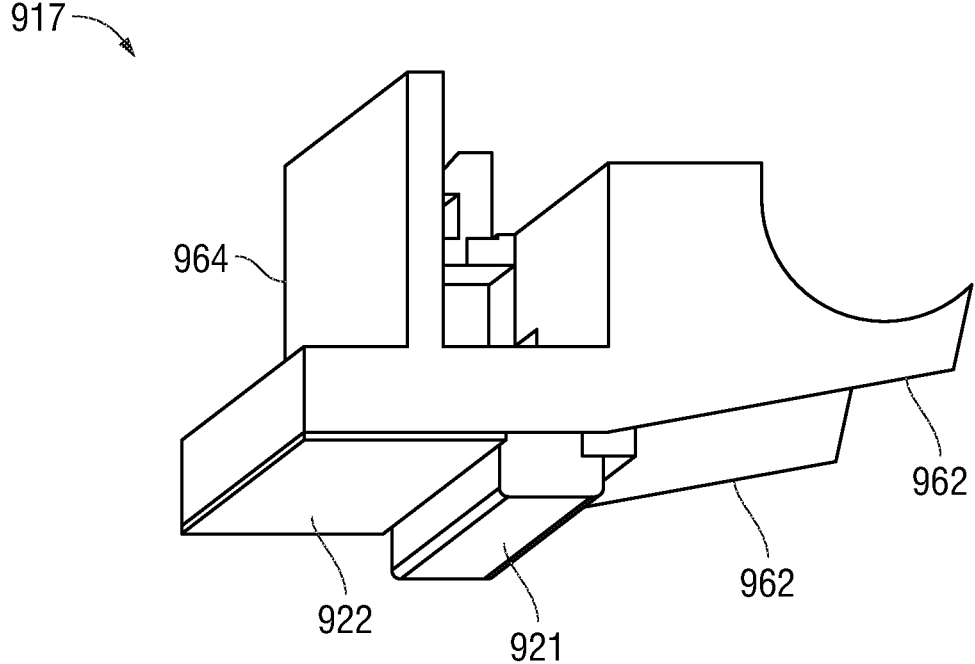
FIG. 9 is a perspective side view of a horseshoe hinge frame antenna holder and antenna according to another embodiment of the present disclosure.

FIG. 9 is a top perspective view from below of a horseshoe hinge frame antenna holder 917 according to an embodiment of the present disclosure. In the embodiment of FIG. 9, a top of the horseshoe hinge frame antenna holder 917 is viewed from below as it would be installed under a c-cover of a base chassis for an information handling system underneath the horseshoe hinge frame antenna holder 917. In other words, the c-cover side of the horseshoe hinge frame antenna holder 917 faces down in FIG. 9. This view includes a view of a display foot 921 installed, via plural stake holes or posts on the horseshoe hinge frame antenna holder 917. The display foot 921, which may comprise rubber or another radiofrequency transparent material, may be installed through an aperture of the metallic c-cover so as to protect a display screen in a closed orientation and provide another radiofrequency via through the metallic c-cover for antennas etched on the horseshoe hinge frame antenna holder 917 in an embodiment. The display foot 921 may also protect the c-cover and any keyboard or touchpad thereon from a tabletop in some orientations such as display orientation or tablet orientation. The horseshoe hinge frame antenna holder 917 further includes a shielding wall 964 with a foil, metallic or other conductive layer disposed thereon to isolate any antenna etched on the horseshoe hinge frame antenna holder 917 from components internal to the base chassis of the information handling system in an embodiment. Further, the horseshoe hinge frame antenna holder 917 may include a gasket 922 that may be conductive and operatively coupled between a ground via on the horseshoe hinge frame antenna holder 917 and a metallic c-cover interfacing with gasket 922 in an embodiment.

The horseshoe hinge frame antenna holder 917 is operatively coupled via screw or other fastener, via snap fit or interference fit, via adhesive, or another method in various embodiments to the underside of a c-cover or top cover for a base chassis of an information handling system according to embodiments herein. An interference fit hook 965 is shown and the body of the horseshoe hinge frame antenna holder 917 may further include edges that interference fit with the c-cover of a base chassis. Interference fit hook 965 may fit with a d-cover or bottom cover of a base chassis in an example embodiment.

The horseshoe hinge frame antenna holder 917 is shown including one or more peninsular holder sides 962 to frame out a horseshoe-shaped hinge cavity that would be disposed at and recessed from an edge of a frame for a base chassis to accommodate a hinge for an information handling system. The horseshoe hinge frame antenna holder 917 may have one or more antennas vias or other circuitry etched thereon for transmission and reception into or from the horseshoe-shaped hinge cavity and through the display foot 921 in some embodiments. The peninsular holder sides 962 may also be etched with one or more antennas in an embodiment or with antenna feed or grounding vias for use with antennas of the horseshoe hinge frame antenna holder 917. FIG. 9 shows an example of the peninsular holder sides 962 of the horseshoe hinge frame antenna holder 917 being shaped to accommodate the hinge shaft of the hinge (not shown). For example, the curved or hook shape that tapers toward the ends of the peninsular holder sides 962 may fit under a c-cover and accommodate the hinge shaft installation across the horseshoe-shaped hinge cavity while framing out sides two and three of the horseshoe-shaped hinge cavity recessed from the base chassis frame edge of the information handling system in an embodiment.

FIG. 10 is a flow diagram illustrating a method 1000 of assembling one or more horseshoe hinge frame antenna holders and antennas thereon with one or more hinges during assembly of an information handling system according to an embodiment of the present disclosure. As described above, an articulated hinge or other hinge may be formed to operatively couple a display chassis and a base chassis for an information handling system such as a convertible laptop type information handling system. The articulated hinge may have a portion mounted to a frame edge of a base chassis in a horseshoe-shaped hinge cavity formed into the frame edge of the base chassis. A gap or space that remains in the horseshoe-shaped hinge cavity to accommodate articulation of the hinge into any of several plural information handling system orientations. That gap or space in the horseshoe-shaped hinge cavity may be used to transmit or receive radio frequency signals via one or more antennas etched or otherwise formed on a horseshoe hinge frame antenna according to embodiments herein. The horseshoe hinge frame antenna holder is integrated under a top cover of a base chassis and integrated into the base chassis to frame out one or more sides of the horseshoe-shaped hinge cavity according to embodiments disclosed herein.

In an embodiment, the method 1000 may begin at block 1005 where the horseshoe hinge frame antenna holder may be formed into a u-shape or horseshoe shape with a main body having at least one outer-facing wall and two peninsular holder sides formed to frame out a recessed space from an edge of a base chassis for a horseshoe-shaped hinge cavity. The horseshoe-shaped hinge cavity may be framed by the horseshoe hinge frame antenna holder and accommodate installation of a hinge structure including a hinge shaft, pin or span. The hinge shaft of the hinge structure spans across the horseshoe-shaped hinge cavity through or below the peninsular holder sides and is secured in a top cover, bottom cover, or both of the base chassis of the information handling system.

The body of the horseshoe hinge frame antenna holder may be made of radiofrequency transparent material such as plastic. For example, the body of the horseshoe hinge frame antenna holder may be formed in an embodiment via injection mold in an embodiment and may include features as embodied in various embodiments herein including the peninsular holder sides formed to taper and curve to accommodate the hinge shaft, pin or span. Further, the horseshoe hinge frame antenna holder may be formed to include a structure that fits into a recess cavity or indentation of a frame edge of a base chassis and under a top cover or c-cover of the base chassis in an embodiment. Additionally, the horseshoe hinge frame antenna holder may be formed to include a shielding wall structure to be disposed internal to the horseshoe hinge frame antenna holder in the base chassis with which a shielding wall may be formed.

At block 1010, in an embodiment, a pattern of conductive material may be laser etched on one or more surfaces of the horseshoe hinge frame antenna holder. In an example embodiment laser direct structuring (LDS) may be used to form the pattern of conductive material. The pattern of conductive material may include one or more antennas etched to any surface of the horseshoe hinge frame antenna holder in various embodiments including an outer-facing wall surface or on either of the peninsular holder sides that frame the horseshoe-shaped hinge cavity recessed from the frame edge of the base chassis. Further, antennas and vias may be etched on horizontal surfaces or vertical surfaces formed on the horseshoe hinge frame antenna holder inside the outer-facing wall surfaces that frame the horseshoe-shaped hinge cavity. As such, the various locations of the etched antenna patterns and the radiofrequency transparent material of the body of the body of the horseshoe hinge frame antenna holder means the etched antenna or antennas may transmit or receive in any direction not blocked by a metallic c-cover or d-cover including through the horseshoe-shaped hinge cavity gap or apertures in the c-cover or d-cover. The pattern of conductive material may further be formed on the horseshoe hinge frame antenna holder to include conductive vias for the antenna patterns as well as one or more via contact points for one or more antenna feed vias as well as one or more ground vias in embodiments herein. With such vias and contacts, the antenna or antennas etched on the horseshoe hinge frame antenna holder may be operatively coupled to one or more wireless interface adapters, such as through a radiofrequency cable including one or more RF front ends and radios for various wireless protocols as taught in embodiments herein.

Proceeding to block 1015, a radiofrequency transparent display foot may be formed into the top cover of the base chassis for the information handling system. The radiofrequency transparent display foot may be inserted into an aperture in the metallic top cover such that radiofrequency signals may be transmitted and received therethrough and through the radiofrequency transparent display foot in some orientations an embodiment. The radiofrequency transparent display foot may be made of rubber in an example embodiment. Further, the radiofrequency transparent display foot may be heat affixed to one or more heat stakes or holes on the horseshoe hinge frame antenna holder to secure it there. The radiofrequency transparent display foot may be installed through the metallic top cover to protect a display screen of the display chassis from contacting the top cover or a keyboard or other structure therein when the information handling system is in a closed configuration in an embodiment. In other embodiments, the radiofrequency transparent display foot may protect the top cover or c-cover and any keyboard or touchpad therein from a tabletop in a display or tablet orientation. The aperture in the c-cover and the radiofrequency transparent material of the display foot provide for another via of radiofrequency signals for the antenna etched on the horseshoe hinge frame antenna holder to be mounted under the c-cover in addition to the gap of the hinge cavity in some embodiments. In this way, the antenna of the horseshoe hinge frame antenna holder may transmit or receive wireless signals via the aperture and through the radiofrequency transparent material of the display foot installed therein.

Additionally at block 1015, a gasket may be attached to a top portion of the horseshoe hinge frame antenna holder which may interface with an underside of the top cover or c-cover of the base chassis. The gasket attached may be a conductive gasket that is operatively coupled to a ground via etched on the horseshoe hinge frame antenna holder as well as grounded to the metallic top cover or c-cover. In this way, a grounding structure is available to the etched antenna pattern determine antenna lengths and antenna function limits.

At block 1015, the horseshoe hinge frame antenna holder may further have a metallic layer, foil, or other conductive layer affixed or formed on a side of the shielding wall to provide a reflective surface to isolate the etched antennas on other portions of the horseshoe hinge frame antenna holder from electronics disposed internally in the base chassis from the horseshoe hinge frame antenna holder and the base chassis frame edge. At this point, the horseshoe hinge frame antenna holder may have been formed with antenna patterns and other circuitry and shielding and is ready to be installed in the information handling system.

In an embodiment at block 1015, the horseshoe hinge frame antenna holder may have the outer-facing wall and any peninsular holder sides painted to match the metallic top cover or c-cover of the base chassis in an embodiment. In such an embodiment, the paint may be radiofrequency transparent paint. In another embodiment, the outer-facing wall and any peninsular holder sides may be otherwise covered with a radiofrequency transparent cover for aesthetic reasons. Further, in an optional embodiment, because the outer-facing wall of the horseshoe hinge frame antenna holder and the peninsular holder sides are internal to the horseshoe-shaped hinge cavity with, ultimately, an articulated hinge installed therein, these surfaces are difficult to see and do not necessarily require a fine-detailed paint coating and matching. This may save manufacturing steps and costs according to embodiments herein.

Proceeding to block 1020 in an embodiment, the formed horseshoe hinge frame antenna holder is operatively coupled via screw or other fastener, via snap fit or interference fit, via adhesive, or another method in various embodiments to the underside of a c-cover or top cover for a base chassis of an information handling system. The horseshoe hinge frame antenna holder is coupled in an embodiment with a display foot installed through an aperture in the metallic c-cover or top cover of the base chassis. The horseshoe hinge frame antenna holder is operatively coupled such that it frames out one or more internal sides of a horseshoe-shaped hinge cavity fitted into a recess in the edge frame of the base chassis for receiving a hinge structure. In an embodiment, the horseshoe hinge frame antenna holder is operatively coupled such that three sides of the horseshoe-shaped hinge cavity are framed by the outer-facing wall of the horseshoe hinge frame antenna holder and two peninsular holder sides. The shielding wall is disposed internally and away from the horseshoe-shaped hinge cavity to shield components further internal to the base chassis in an embodiment. Additionally, the gasket is coupled to interface with the underside of the c-cover or top cover of the base chassis in one embodiment.

At block 1025, the antennas and other circuit etch patterns on the horseshoe hinge frame antenna holder are operatively coupled via an antenna feed to one or more wireless interface adapters in an embodiment. An RF cable is soldered or otherwise electrically coupled to the antenna feed location on the horseshoe hinge frame antenna holder. Further, the antennas or other circuit etch patterns on the horseshoe hinge frame antenna holder are operatively and electrically coupled to ground in an embodiment. Similarly, soldering, conductive adhesive, or other electrical coupling technique may be used to couple a ground cable or the gasket to a grounding source such as the metallic c-cover.

At block 1030, a hinge shaft, pin or span of an articulated hinge having a hinge cap may be installed across the horseshoe-shaped hinge cavity such that the hinge shaft, pin, or span extends past the peninsular holder sides into a receiving structure to mount to the c-cover or top cover of the base chassis or be secured by a receiving structure in the d-cover or bottom cover of the base chassis when the d-cover is installed to the c-cover. The order of installation of the hinge may be changed as understood by those of skill. For example, the hinge may be installed on the d-cover first and then operatively coupled to the c-cover with the d-cover to form the base chassis in some embodiments. The hinge structure may further be installed, for example by a second hinge shaft, pin or span, to a display chassis containing a display device and its supporting electronics in an embodiment. In this way the display chassis will be operatively coupled to the base chassis of the information handling system via the articulated hinge structure.

Proceeding to block 1035, the bottom cover may have installed the components of the system model for the information handling system according to that described in FIG. 1 above. For example, a processor, GPU, other processing resources, memory, data storage, motherboard, other circuit boards, and power system including batteries and power adapter may be installed in the bottom cover or d-cover of the base chassis in various embodiments. Further, as described, the articulated hinge structure may be installed in the d-cover at the base chassis frame edge in a hinge receiver structure of the d-cover such that it is located in the horseshoe-shaped hinge cavity in an embodiment. Then the d-cover or bottom cover may be attached to the c-cover or top cover via screws or other fasteners, via snap fitting or interference fitting, or other methods to form the base chassis. The hinge or hinges will be operatively coupled in the horseshoe-shaped hinge cavity or cavities of the base chassis and will operatively couple the display chassis to the base chassis. Thus, the information handlings system may be assembled with any remaining final steps and prepared for operation or sale. At this point, the method may end.

The blocks of the flow diagram of FIG. 10 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system including a horseshoe hinge frame antenna holder and antenna comprising:
   a processor, memory, power source and wireless interface adapter;
   a display chassis and a display screen;
   a base chassis including a horizontal horseshoe-shaped hinge cavity formed into a back length edge of the base chassis for operatively coupling the base chassis to the display chassis via an articulated hinge with an articulated hinge component horizontally spanning horizontal horseshoe-shaped hinge cavity formed into a back length edge of the base chassis between a first sidewall of the horizontal horseshoe-shaped hinge cavity and a second sidewall for the horizontal horseshoe-shaped hinge cavity;

the horseshoe hinge frame antenna holder operatively coupled into a back wall of the horizontal horseshoe-shaped binge cavity in the back length edge of the base chassis and having a horseshoe hinge frame antenna holder body comprised of a radiofrequency transparent material to fit under a metallic top cover of the base chassis;
the horseshoe hinge frame antenna holder having an outer-facing wall, where the outer-facing wall of the horseshoe hinge frame antenna holder frame out the back wall of the horizontal horseshoe-shaped hinge cavity in the back length edge of the base chassis;
an antenna pattern etched onto the horseshoe hinge frame antenna holder in a conductive material to form the antenna operatively coupled to the wireless adapter, the antenna disposed on a first surface of the horseshoe hinge frame antenna holder, where the antenna may transmit or receive radiofrequency signals via a gap in the horizontal horseshoe-shaped hinge cavity; and
the articulated hinge including a hinge shaft that spans the horseshoe hinge frame antenna holder formed around the horizontal horseshoe-shaped hinge cavity in the back length edge of the base chassis and which rotates within the horizontal horseshoe-shaped hinge cavity.

2. The information handling system of claim 1 further comprising:
   the horseshoe hinge frame antenna holder having a peninsular holder side extending from the outer-facing wall of the horseshoe hinge frame antenna holder to frame out the first sidewall of the horizontal horseshoe-shaped hinge cavity in the back length edge of the base chassis.

3. The information handling system of claim 1 further comprising:
   the horseshoe hinge frame antenna holder having a plurality of peninsular holder sides extending from the outer-facing wall of the horseshoe hinge frame antenna holder to frame out a first sidewall and the second sidewall of the horizontal horseshoe-shaped hinge cavity in the back length edge of the base chassis; and
   the peninsular holder sides tapered to accommodate the hinge shaft installed across the horizontal horseshoe-shaped hinge cavity.

4. The information handling system of claim 1 further comprising:
   a rubber display foot installed through an aperture in the metallic top cover of the base chassis to protect the display screen when the information handling system is in a closed configuration; and
   the antenna transmitting and receiving radio frequency signals via the aperture and the rubber display foot.

5. The information handling system of claim 1, wherein the antenna pattern is for a planar inverted-F antenna (PIFA) etched at least in part on the outer-facing wall as the first surface of the horseshoe hinge frame antenna holder.

6. The information handling system of claim 1 further comprising:
   the body of the horseshoe hinge frame antenna holder including a shielding wall structure with a metallic layer to electrically shield the antenna from components internal to the base chassis, where the shielding wall structure is disposed internally in the base chassis relative to the outer-facing wall and opposite from the back wall of the horizontal horseshoe-shaped hinge cavity.

7. The information handling system of claim 1 further comprising:

a second horseshoe hinge frame antenna holder operatively coupled into the edge of the base chassis and comprising a second horseshoe hinge frame antenna holder body to fit under the metallic top cover of the base chassis and having a second outer-facing wall, where the second outer-facing wall of the second horseshoe hinge frame antenna holder frames out a portion of a second horizontal horseshoe-shaped hinge cavity in the back length edge of the base chassis to receive a second articulated hinge to operatively couple the display chassis.

8. The information handling system of claim 1 further comprising:

the articulated hinge including a metallic hinge cap to rotate with the hinge in the horizontal horseshoe-shaped hinge cavity and reflect the radio frequency signals to assist the transmission or reception of the radio frequency signals via the gap of the horizontal horseshoe-shaped hinge cavity between the articulated hinge and the backwall of the horizontal horseshoe-shaped hinge cavity.

9. The information handling system of claim 1 further comprising:

a conductive gasket operatively coupled to the top of the horseshoe hinge frame antenna holder to ground the horseshoe hinge frame antenna holder to the metallic top cover of the base chassis, where the horseshoe hinge frame antenna holder is operatively coupled to the metallic top cover via a fastener or an interference fit structure.

10. An articulated hinge structure for coupling a display chassis and a base chassis of an information handling system comprising:

the articulated hinge structure including a first hinge shaft operatively coupled across a horizontal horseshoe-shaped hinge cavity recessed from a back length edge of the base chassis, the first hinge shaft to rotate in the horizontal horseshoe-shaped hinge cavity;

the articulated hinge structure including a second hinge shaft operatively coupled to the display chassis;

a metallic hinge cap to cover the first hinge shaft and the second hinge shaft of the articulated hinge structure fitted within the horizontal horseshoe-shaped hinge cavity;

a horseshoe hinge frame antenna holder operatively coupled into the horizontal horseshoe-shaped binge cavity, where the horizontal horseshoe-shaped hinge cavity is recessed from the back length edge of the base chassis and comprising a body of a radiofrequency transparent material to fit under a metallic top cover of the base chassis and having an outer-facing wall, where the outer-facing wall of the horseshoe hinge frame antenna holder frames out a back wall of the horizontal horseshoe-shaped hinge cavity recessed in the back length edge of the base chassis to accommodate the first hinge shaft of the articulated hinge structure across the horseshoe hinge frame antenna holder formed as a first sidewall, a second sidewall, and the backwall of the interior of the horizontal horseshoe-shaped hinge cavity; and an antenna pattern etched onto the horseshoe hinge frame antenna holder in a conductive material to form the antenna operatively coupled to the wireless adapter, the antenna disposed on a first surface of the horseshoe hinge frame antenna holder, where the antenna may transmit or receive radiofrequency signals via a gap in the horizontal horseshoe-shaped hinge cavity between the articulated hinge structure and a backwall of the horizontal horseshoe-shaped hinge cavity.

11. The articulated hinge structure of claim 10, wherein the outer-facing wall of the horseshoe hinge frame antenna holder is painted with radiofrequency transparent paint to blend in with the metallic top cover of the base chassis.

12. The articulated hinge structure of claim 10, wherein the outer-facing wall of the horseshoe hinge frame antenna holder is the first surface on which the antenna is disposed.

13. The articulated hinge structure of claim 10, wherein the antenna pattern forms a monopole or loop antenna at least in part on the outer-facing wall of the horseshoe hinge frame antenna holder.

14. The articulated hinge structure of claim 10 further comprising:

the horseshoe hinge frame antenna holder having a plurality of peninsular holder sides extending from the outer-facing wall of the horseshoe hinge frame antenna holder to frame out a second side and a third side of the horizontal horseshoe-shaped hinge cavity recessed from the back length edge of the base chassis; and the peninsular holder sides tapered and shaped to accommodate the hinge shaft installed across the horizontal horseshoe-shaped hinge cavity between the second side and the third side of the horizontal horseshoe-shaped hinge cavity.

15. A horseshoe hinge frame antenna holder and antenna integrated into a back length edge of a base chassis of an information handling system comprising:

the horseshoe hinge frame antenna holder comprising a body having a radiofrequency transparent material to fit under a metallic top cover of a base chassis and having an outer-facing wall, where the outer-facing wall of the horseshoe hinge frame antenna holder frames out a backwall of a horizontal horseshoe-shaped hinge cavity recessed into the back length edge of the base chassis to receive a hinge across the horseshoe hinge frame antenna holder formed as a first sidewall and a second sidewall of the interior of the horizontal horseshoe-shaped hinge cavity for coupling a display chassis to the base chassis via the hinge;

an antenna pattern etched onto the horseshoe hinge frame antenna holder in a conductive material to form the antenna on a first surface of the horseshoe hinge frame antenna holder, where the antenna may transmit or receive radiofrequency waves via the horizontal horseshoe-shaped hinge cavity; and the antenna pattern electrically coupled to a wireless adapter of an information handling system.

16. The horseshoe hinge frame antenna holder of claim 15 further comprising:

the body of the horseshoe hinge frame antenna holder including a shielding wall structure with a metallic layer to electrically shield the antenna from components internal to the base chassis, where the shielding wall structure is disposed internally in the base chassis relative to the outer-facing wall and interior to the horizontal horseshoe-shaped hinge cavity.

17. The horseshoe hinge frame antenna holder of claim 15 further comprising:

the horseshoe hinge frame antenna holder having a peninsular holder side extending from the outer-facing wall of the horseshoe hinge frame antenna holder to frame out a second side of the horizontal horseshoe-shaped hinge cavity recessed into the back length edge of the base chassis.

18. The horseshoe hinge frame antenna holder of claim 15 further comprising:

the horseshoe hinge frame antenna holder having a plurality of peninsular holder sides extending from the outer-facing wall of the horseshoe hinge frame antenna holder to frame out the horizontal horseshoe-shaped hinge cavity recessed into the back length edge of the base chassis: and the peninsular holder sides tapered to accommodate a hinge shaft installed across the horizontal horseshoe-shaped hinge cavity between the peninsular holder sides.

19. The horseshoe hinge frame antenna holder of claim 15 further comprising:

a rubber display foot operatively coupled to the top of the horseshoe hinge frame antenna holder for insertion through an aperture in the metallic top cover of the base chassis; and the antenna transmitting and receiving radio frequency signals via the aperture and the rubber display foot.

20. The horseshoe hinge frame antenna holder of claim 15 wherein the antenna pattern is for a planar inverted-F antenna (PIFA) etched at least in part on the outer-facing wall.

\* \* \* \* \*